US008146533B2

(12) United States Patent
Beltezore et al.

(10) Patent No.: US 8,146,533 B2
(45) Date of Patent: Apr. 3, 2012

(54) ANCHORED ANIMAL TREAT HOLDERS AND METHODS

(75) Inventors: Lisa L. Beltezore, Thornton, CO (US); Caroline A. Shengle, Thornton, CO (US)

(73) Assignees: Lisa L. Beltezore, Thornton, CO (US); Caroline A. Shengle, Thornton, CO (US)

( * ) Notice: Subject to any disclaimer, the term of this patent is extended or adjusted under 35 U.S.C. 154(b) by 821 days.

(21) Appl. No.: 11/383,129

(22) Filed: May 12, 2006

(65) Prior Publication Data

US 2006/0254301 A1 Nov. 16, 2006

Related U.S. Application Data

(60) Provisional application No. 60/680,819, filed on May 14, 2005.

(51) Int. Cl.
*A01K 5/00* (2006.01)
*A23G 9/00* (2006.01)
(52) U.S. Cl. ............... 119/51.03; 119/61.5; 119/61.57; 119/72; 426/66; 426/134; 426/515; 62/340; 62/459
(58) Field of Classification Search ............... 119/53, 119/60, 69, 786, 788, 51.03, 51.01, 58, 57.8, 119/57.9, 51.5, 61.5–61.57, 72–81; D7/387; D1/100, 105; 206/32, 39; 248/370, 127, 248/156, 159; 426/66, 134, 68, 524, 512, 426/515, 805; 62/340, 343, 457.6–457.7, 62/459
See application file for complete search history.

(56) References Cited

U.S. PATENT DOCUMENTS

| 1,531,842 | A | * | 3/1925 | Carpenter | 119/51.01 |
| 2,142,825 | A | * | 1/1939 | Patten | 119/51.03 |
| 2,661,719 | A | * | 12/1953 | Scheidt et al. | 119/51.03 |
| 2,664,856 | A | * | 1/1954 | Ferris | 119/51.03 |
| 2,939,299 | A | | 6/1960 | Sherbloom | |
| 3,088,643 | A | * | 5/1963 | Dunn | 426/134 |
| 3,780,703 | A | * | 12/1973 | Boehland, Jr. | 119/53 |
| 4,218,482 | A | | 8/1980 | Cook et al. | |
| 5,345,892 | A | * | 9/1994 | Khan | 119/51.5 |
| 5,618,463 | A | * | 4/1997 | Rindler et al. | 249/92 |
| 6,032,825 | A | * | 3/2000 | Guthrie | 220/731 |
| 6,054,156 | A | * | 4/2000 | Rudell et al. | 426/104 |
| 6,315,433 | B1 | | 11/2001 | Cavello | |
| 6,360,690 | B1 | * | 3/2002 | Canby | 119/52.2 |
| 6,640,558 | B1 | | 11/2003 | Zenisek | |
| 2003/0019435 | A1 | * | 1/2003 | George | 119/51.01 |
| 2005/0013899 | A1 | | 1/2005 | Kostlan et al. | |

FOREIGN PATENT DOCUMENTS

DE 102 22 460 A1 2/2002
* cited by examiner

*Primary Examiner* — Drew Becker
*Assistant Examiner* — Luana Z Long
(74) *Attorney, Agent, or Firm* — Kilpatrick Townsend & Stockton LLP (57) ABSTRACT

According to the invention, an apparatus for providing a frozen edible substance to an animal is disclosed. In one embodiment, the apparatus includes a container, a support element, a securing element, and a mounting element. The container may be configured to receive an edible substance and contain the edible substance during freezing of the edible substance, but be removable from the substance afterwards. The support element may be configured to receive and support the edible substance after freezing. The securing element may be configured to couple with the edible substance during freezing and secure the edible substance to the support element. The mounting element may be configured to couple with the support element and secure the support element to a surface.

20 Claims, 10 Drawing Sheets

ANCHORED ANIMAL TREAT HOLDERS AND METHODS

PRIORITY CLAIM

This application claims priority to Provisional U.S. Patent Application No. 60/680,819 filed May 14, 2005, entitled "Anchored Ice Treat Holder with Container Mold for Pets," the entire disclosure of which is hereby incorporated by reference as if fully set forth herein.

BACKGROUND OF THE INVENTION

This invention relates generally to pet and animal products. More specifically, the invention relates to apparatuses and methods for providing edible substances to animals.

In 2004, 39% of American households owned at least one dog and 34% owned at least one cat. Some of these households and others also own other types of pets or animals. Nearly all of these animals must be fed and watered every day. The need for water is especially heightened during warmer periods of the year such as late spring, summer, and early autumn when animals may be warmer and more active. Animal owners may sometimes desire to use creative apparatuses and methods of providing hydration that encourage their animals to ingest more water, while also possibly allowing for innovative methods of behavioral modification.

BRIEF DESCRIPTION OF THE INVENTION

In one embodiment an apparatus that provides a frozen edible substance to an animal is provided. The apparatus may include a container configured to receive an edible substance, contain the edible substance during freezing of the edible substance, and be removable from the edible substance after freezing of the edible substance. The apparatus may also include a support element configured to receive the edible substance after freezing of the edible substance and support the edible substance after freezing of the edible substance. The apparatus may further include a securing element configured to couple with the edible substance during freezing of the edible substance and secure the edible substance to the support element. The apparatus may also include a mounting element configured to couple with the support element and secure the support element to a surface.

In some embodiments the support element may be configured to allow the edible substance, during melting of the edible substance, to drain from the support element. In these or other embodiments, the apparatus may also include a collection element configured to collect at least a portion of the edible substance after melting of the edible substance. In some embodiments the apparatus may include an extension element configured to couple with the mounting element, couple with the support element, and be disposed between the mounting element and the support element.

In another embodiment, another apparatus for providing a frozen edible substance to an animal is provided. The apparatus may include a means for containing an edible substance during freezing of the edible substance. The apparatus may also include a supporting means for supporting the edible substance after freezing of the edible substance. The apparatus may further include a means for securing the edible substance after freezing of the edible substance to the supporting means. The apparatus may also include a securing means for securing the supporting means to a surface.

In some embodiments the apparatus may also include a means for draining the edible substance during melting of the edible substance from the supporting means. In these or other embodiments, the apparatus may also include a means for collecting the edible substance during melting of the edible substance. In some embodiments the apparatus may include a means for increasing a distance between the supporting means and the securing means.

In another embodiment, a method for providing a frozen edible substance to an animal is provided. The method may include providing a support element and securing the support element to a surface. The method may also include providing a container and receiving an edible substance into the container. The method may further include providing a securing element and disposing at least part of the securing element in the edible substance. The method may freeze the edible substance in the container while the securing element is at least partial disposed in the edible substance. Finally, the method may remove the frozen edible substance and securing element from the container, and couple the securing element with the support element, thereby securing the frozen edible substance to the supporting element. In some embodiments, the method may include providing a collection element configured to collect as least a portion of the edible substance after melting of the frozen edible substance.

BRIEF DESCRIPTION OF THE DRAWINGS

The present invention is described in conjunction with the appended figures.

In the appended figures, similar components and/or features may have the same numeric reference label. Further, various components of the same type may be distinguished by following the numeric reference label by a second alphabetic label that distinguishes among the similar components. If only the first reference label is used in the specification, the description is applicable to any one of the similar components having the same first numeric reference label irrespective of the second alphabetic reference label.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing various exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, some basic components such as fastening mechanisms may not be specifically shown as components in appended figures in order not to obscure the embodiments in unnecessary detail. In other instances, well-known structures and techniques may be shown without unnecessary detail in order to avoid obscuring the embodiments.

Also, it is noted that individual embodiments may be described as a process which is depicted as a block diagram. Although a block diagram may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, or a procedure, etc.

In one embodiment, an apparatus that provides a frozen edible substance to an animal is provided. The apparatus may include a container, a support element, a securing element, and a mounting element.

The container may be configured to receive an edible substance, contain the edible substance during freezing of the edible substance, and be removable from the thereafter frozen edible substance. The container may be a bucket, a can, or another vessel capable of holding a wide variety of liquids, including water based liquids, without substantially leaking. Logos or trademarks may be inset or possibly adhered on the exterior of the container. The container may be of various shapes, sizes, textures, and/or colors. In some embodiments, the container may be "bundt" shaped, toroidal-shaped, a shape generated by rotating a variable or constant cross sectional shape about a central axis, or any shape having a hallow center portion.

In other embodiments the container may be made from multiple pieces, which may seal together to allow for "molds" of different shapes of frozen edible substance to be created. Examples of some possible shapes that may use such multiple-piece containers are a fire hydrant shape or an animal shape (for example, the shape of a dog, cat or squirrel). The container may be made from numerous materials, including metals, plastics, polymers, and/or composites. In some embodiments, the container may have a handle to facilitate handling during receiving of the edible of substance and placement of the filled container in a freezing apparatus, possibly a household freezer.

In some embodiments, the edible substance may be a mixture of a liguid, possibly water or broth, and other food products including, without limitation powder mixtures intended for dissolving in water. Other more conventional human food products may also be used for at least some portion of the frozen edible substance. In some embodiments, pet treats such as dog-bones and other generally solid food products may be suspended in the frozen edible substance. Animal toys and/or other inedible items or substances such as rubber balls, rope toys, etc. may also be suspended in the frozen edible substance. An animal may lick away the frozen edible substance, allowing the suspended pet treats and/or animal toys to eventually be retrieved from the frozen edible substance.

The support element may be configured to receive the frozen edible substance, and/or support the frozen edible substance. The support element may be made from numerous materials, including metals, plastics, polymers, and/or composites. The support element may, for example, be pan-shaped, saucer-shaped, bowl-shaped, plate-shaped, flat, or possibly irregularly-shaped, perhaps to correspond and mate with an irregularly-shaped frozen edible substance produced with an irregularly-shaped container.

In some embodiments, the support element may be configured to allow the edible substance, during melting of the frozen edible substance, to drain from the support element. In various embodiments this may be achieved by the support element defining openings through the support element. These openings may be configured to be generally located under and around the base of the frozen edible substance.

In some embodiments, the shape of the support element may be configured to allow drainage. For instance, in an embodiment with a bowl-shaped support element, the bowl shape may be inverted, allowing melting edible substance to drain away and off the support element. In an embodiment with a flat-shaped support element, the melting edible substance may merely collect on the support element and drain off the edges. A similar type of drainage may occur in other embodiments, such as when a pan-shaped support element is full of melted edible substance and overflows. Drainage may be encouraged in some of these embodiments by additional openings in the support element.

In some embodiments, the apparatus may also include a collection element configured to collect at least a portion of the liquid edible substance. The collection element may be made from numerous materials, including metals, plastics, polymers, and/or composites. The collection element may be located beneath the support element and/or be configured to catch falling edible substance. The collection element may, in some embodiments be similar in shape and size to the support element. In other embodiments the collection element will be different in shape and size from the support element. In embodiments with openings in the support element, the collection element may be sized to catch edible substance falling from the openings. The collection element may be coupled with the rest of the apparatus, such that it allows an animal to drink from the collection element without interference from the support element. For example, the collection element may be located at a distance below the support element which allows a dog to drink from the collection element without obstruction from the above support element. In some embodiments a user may adjust where the collection element is located relative to the support element.

The securing element may be configured to couple with the edible substance during freezing of the edible substance, and secure the edible substance to the support element. The securing element may be made from numerous materials, including metals, plastics, polymers, and/or composites. The securing element may secure the frozen edible substance to the support element by detachably, or permanently, coupling with, at least some other portion of the apparatus. By securing the frozen edible substance to the support element, movement of the frozen edible substance in relation to the support element may be limited to certain distances and/or direction or eliminated. The securing element may couple with the edible substance before or after freezing.

The securing element may include a longitudinal member and a lateral member. As an example, a user may fill the container with a liquid edible substance and dispose the securing element in the edible substance. The securing element may be sized such that the longitudinal member is longer than the container is deep, thereby leaving at least a portion of the securing element extending from the liquid edible substance. The lateral member of the securing element may rest at the bottom of the container.

In some embodiments the lateral member may be sized such that it is substantially the same length as the diameter or other similar crosswise measurement of the bottom on the container. This may configure the securing element to center itself in the container and consequently the edible substance after freezing. In other embodiments the securing member may be centered in the edible substance by the lateral member being flat and resting on the bottom of the container. A cover for the container in these embodiments may define a centered opening which the longitudinal member of the securing element may protrude through and thereby be centered. The cover may be removed prior to the supporting element receiving the frozen edible substance.

The lateral member of the securing element may be various shapes and sizes. In some embodiments the lateral member may be customized and have a logo or trademark inset or adhered to it. Possible customizations of the lateral member may be shapes associated with various animals, for example a bone shape for a consumer who desires to use the apparatus for providing the edible substance to a dog, or a mouse shape for a consumer with a cat. The lateral member may be detachably coupled with the longitudinal member such that a user could replace the lateral member with a differently customized lateral member. Various mechanical configurations, known in the art, may be employed to make the lateral member detachably coupleable with the longitudinal member such as machine threads, interference fits, and the use of screws or other fasteners.

The mounting element may be configured to couple with the support element, and secure the support element to a surface. The mounting element may be made from numerous materials, including metals, plastics, polymers, and/or composites. The mounting element may couple with the support element either directly or indirectly, and may be detachably or permanently coupled with the support element. The mounting element may include a member for securing to a surface. This member may be a pitchfork member, a spiked member, a corkscrew or auger member, a channel member, and/or a hooked member.

In some embodiments, the mounting element may be non-skid pads coupled with the bottom of the support element. In these embodiments, the support element may be located on a surface with the non-skid pads between the support element and the surface. In another embodiment, the mounting element may include members having a variety of shapes, including pan-shapes, saucer-shapes, bowl-shapes, plate-shapes, flat, or possibly irregularly-shapes. In these or other embodiments, the mounting element may secure to a surface and couple with the support element such that the top of the mounting element is proximal to the ground and the support element is coupled proximal with the top of the mounting element.

In other embodiments, the mounting element may include a substantially hallow vessel that may be filled with a substance, for example, water, sand and/or the like, to give extra weight to the mounting element. The weight of the mounting element may thereafter substantially secure the supporting element to a surface, possibly due to the friction between the mounting element and the surface. The mounting element in these embodiments may also have non-skid pads on the bottom of the vessel to assist in securing the mounting element to a surface.

These or other mounting elements of the invention may be employed to secure the support element to the ground, a deck, a fence, indoor or outdoor flooring, a kennel, a cage, a tree, an animal enclosure and/or other surface. The deck may be of various configurations, possibly with a substantially horizontal surface of wooden or other material members. The fence may be of various configurations, possibly with a substantially vertical surface of wooden or chain-link members.

Different mounting elements may be more suitable, in some embodiments, for different surfaces. For instance, the pitchfork member, spiked member, and/or corkscrew member may be more suitable for securing the support element to the ground, while the channel member may be more suitable for the deck. A hooked member may be more suitable for the fence. Other types of members may be employed on the mounting elements of the invention, including for example, a multi-legged stand. While some members such as the pitchfork, spike, or corkscrew may penetrate the surface they secure the support element to, other members may not penetrate the surface, such as a multi-leg stand. In some embodiments, the support element may merely sit on the surface it is secured to.

In some embodiments, the apparatus may also include an extension element. The extension element may be made from numerous materials, including metals, plastics, polymers, and/or composites. The extension element may be configured to couple with the mounting element, couple with the support element, and be disposed between the mounting element and the support element. The extension element may be configured to thereby increase the distance between the mounting element and the supporting element. This may raise the height of the support element and consequently the frozen edible substance to a height more suitable for the animal for which the edible substance is intended. In some embodiments, a plurality of extension elements may be used to further increase the distance between the mounting element and the supporting element. The plurality of extension elements may couple with each other as well as the supporting element and the mounting element.

Figure 1:
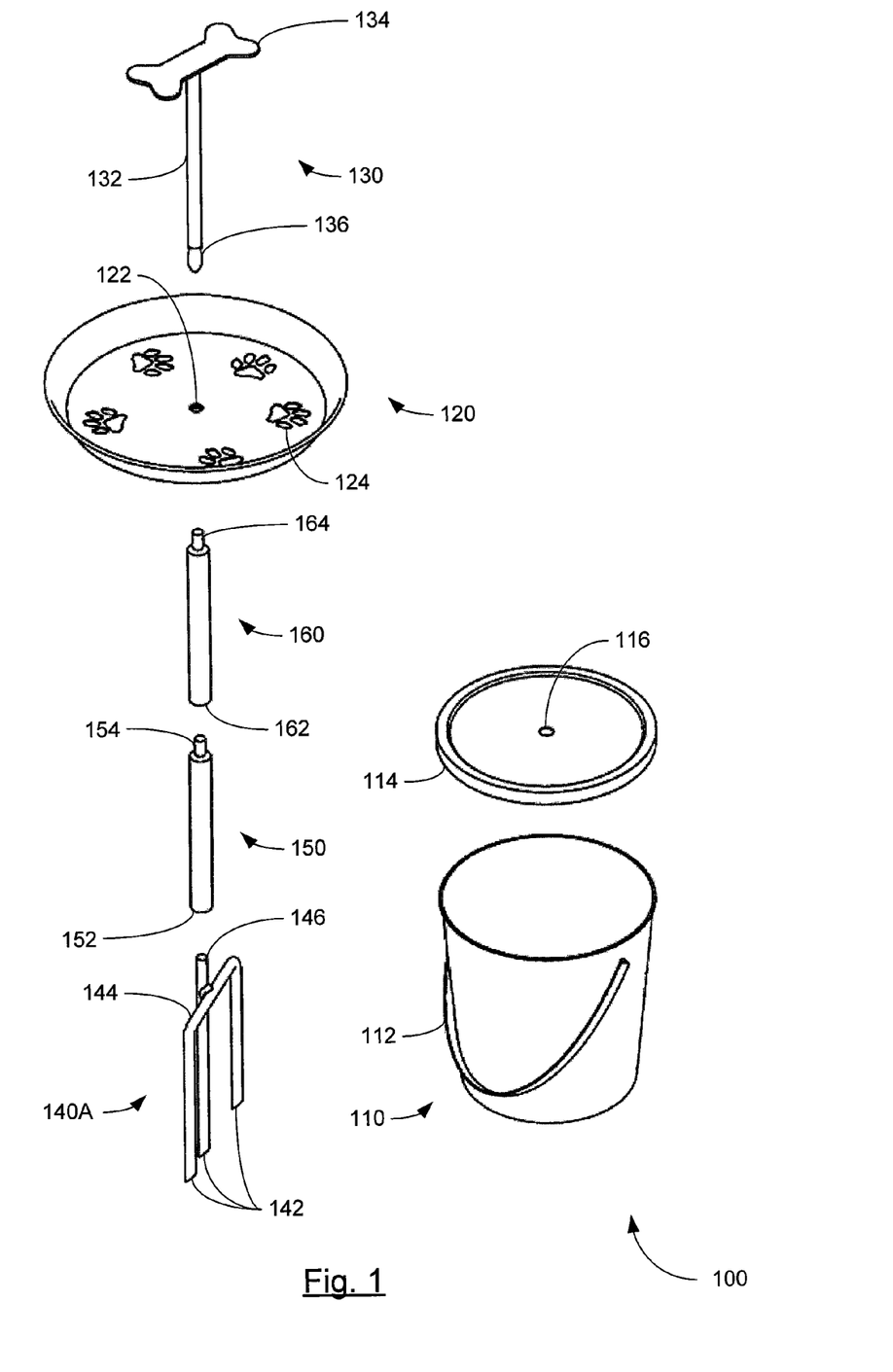
FIG. 1 is an assembly drawing of an apparatus embodiment of the invention for providing a frozen edible substance to an animal.

Turning now to FIG. 1, an assembly drawing is shown of an apparatus 100 of the invention for providing a frozen edible substance to an animal. Apparatus 100 includes a container 110, a support element 120, a securing element 130, a mounting element 140A, and two extension elements 150, 160. Though in this embodiment all of the elements are detachably coupleable, in other embodiments at least some of the elements may be permanent coupled.

In one example of how apparatus 100 may be used, a user may fill container 110, shown in this embodiment as a bucket, with a substantially liquid edible substance, possibly containing suspended pet toys. A handle 112 on container 110 may assist the user in filling and moving container 110. Once at least partially filled, the user may invert and dispose securing element 130 into the edible substance. Securing element 130 may have a longitudinal member 132 and a lateral member 134. In this embodiment, lateral member 134 is shown as a flat bone shape member. When disposed, lateral member 134 of securing element 130 may sit at the bottom of container 110. Lateral member 134 may be characterized by a length which is similar to the diameter of the inside base of container 110. This may assist in centering securing element 130 in container 110 and the edible substance.

A coupling tip 136 of securing element 130 may then protrude from the top of container 110. The user may put a lid 114 with opening 116 onto container 110. The lid may assist in reducing splashing and waste of the edible substance during movement. Coupling tip 136 may protrude from opening 116 when lid 114 is attached to container 110. The opening 116 may be centered to provide a method of centering longitudinal member 132 of securing element 130 in the edible substance. A user may then freeze container 110 with securing element 130 disposed in it, possibly by storing the container 110 for a period of time in a freezer.

Possibly while the edible substance is freezing, the user may find a suitable location for providing the edible substance to an animal. In this example, the user may determine to locate the edible substance, once frozen in a yard of the user's residence. The user may then insert mounting element 140A into the ground by pressing penetration points 144 into the ground until cross bar 144 is at or near ground level. The user may then couple extension element 150 with mounting element 140A. A coupling point 146 on mounting element 140 may be coupled with a coupling point 152 on extension element 150. Another extension element 160 may also be coupled with the apparatus using similar coupling points 154 and 162. The coupling points 146, 152, 154, 162 may be any type of coupling mechanism known in the art, either detachable or permanent. For example, some detachable coupling mechanisms are machine threads, interference fits, and the use of screws or hairpin fasteners, while a possible permanent coupling mechanism is welding.

The user may then couple support element 120 with extension element 160. Support element 120 may be coupled directly to extension element 160 at coupling point 122, or via another element. Support element 120 may have inset markings 124 for decorative purposes. In some embodiments, inset markings 124 may be openings allowing support element 120 to drain as the frozen edible substance melts. In other embodiments, inset markings 124 may exist as well as other openings which allow for drainage.

The user may then remove container 110 from the freezer, when the edible substance has at least partially frozen. The user may remove top 114 revealing the frozen edible substance with coupling tip 136 protruding from the frozen edible substance. The user may then invert container 110 over support element 120. Coupling tip 136 may be inserted into coupling point 122, thereby securing the frozen edible substance to support element 120. In the embodiment pictured in FIG. 1, support element 120 may have an integral or detachably coupled member on the underside designed to accept coupling point 164 of extension element 160 and coupling tip 136. Detachable coupling mechanisms, as discussed above, or otherwise known in the art, could be used to provide a detachable coupling.

Embodiments of the invention may be assembled in any order. Merely by way of example, in another method of using the apparatuses of the invention, a user may couple the mounting element 140A with or without the extension element 160 to the support element 120, and then secure the apparatus 100 to a surface. In another embodiment, support element 120 may be coupled with securing element 130 before container 110 is removed from the edible substance. In some embodiments, only a portion of container 110 may be removed from the edible substance before or after coupling with support element 120.

A frozen edible substance may therefore be provided for consumption by an animal at the location of the apparatus. Securing the frozen edible substance in one location may allow a user to predetermine an advantageous location to provide a treat for an animal, possibly based on cleanliness and/or accessibility concerns. The user may also determine that a certain area is better than others based on likely locations where the animal will react most favorably to the edible substance. Other user considerations, such as behavioral modification objectives, may include selecting a certain area to encourage the animal to spend more time in an area, and consequently spend less time in other areas. Another possible reason to use the apparatus may be in response to favorable behavior by the animal. Many other behavioral modification plans and objectives will now also be recognizable to those skilled in the art.

Figure 2:
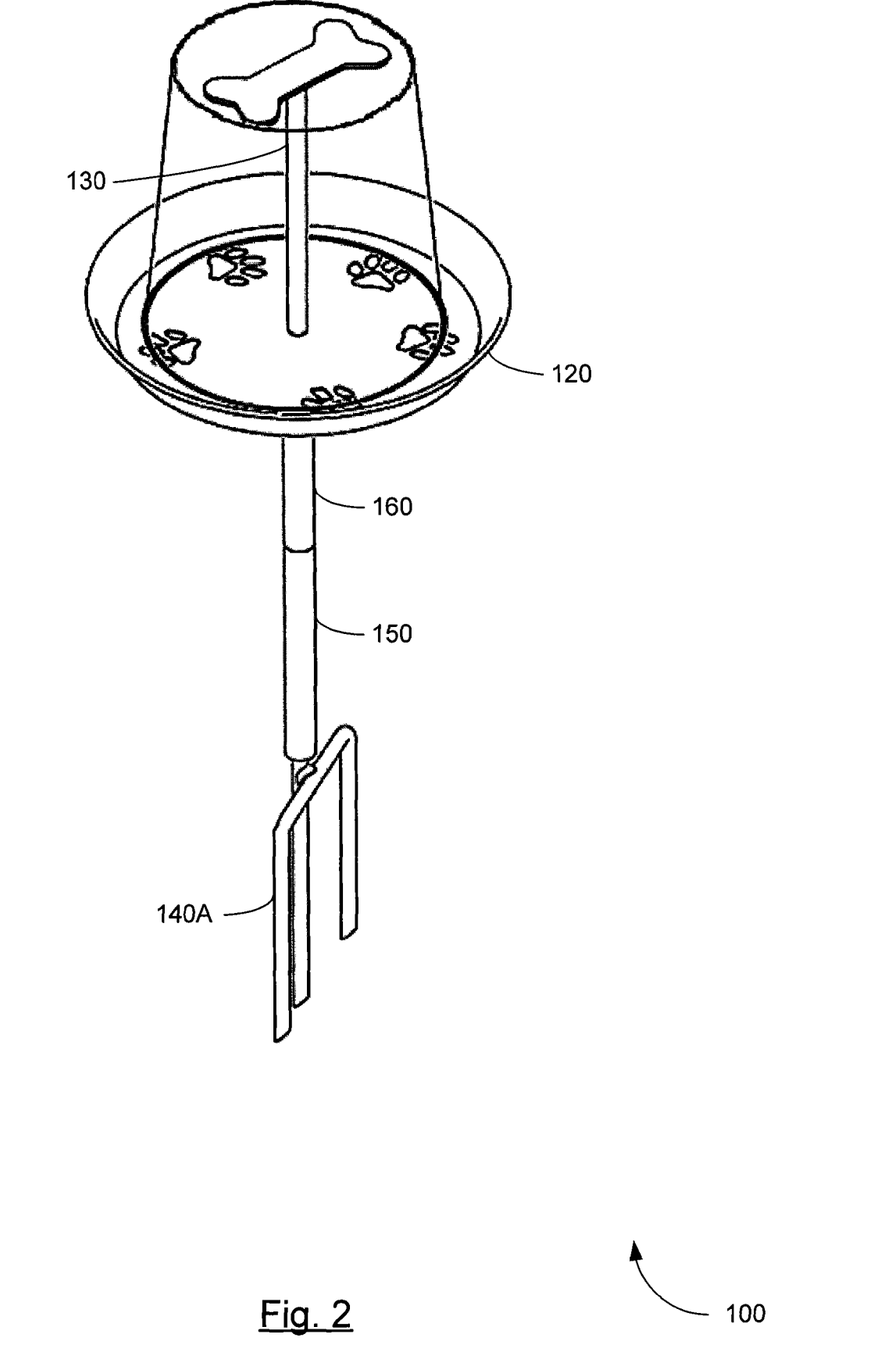
FIG. 2 is a drawing of the apparatus from FIG. 1, fully assembled with a frozen edible substance supported by the apparatus.
Figure 3:
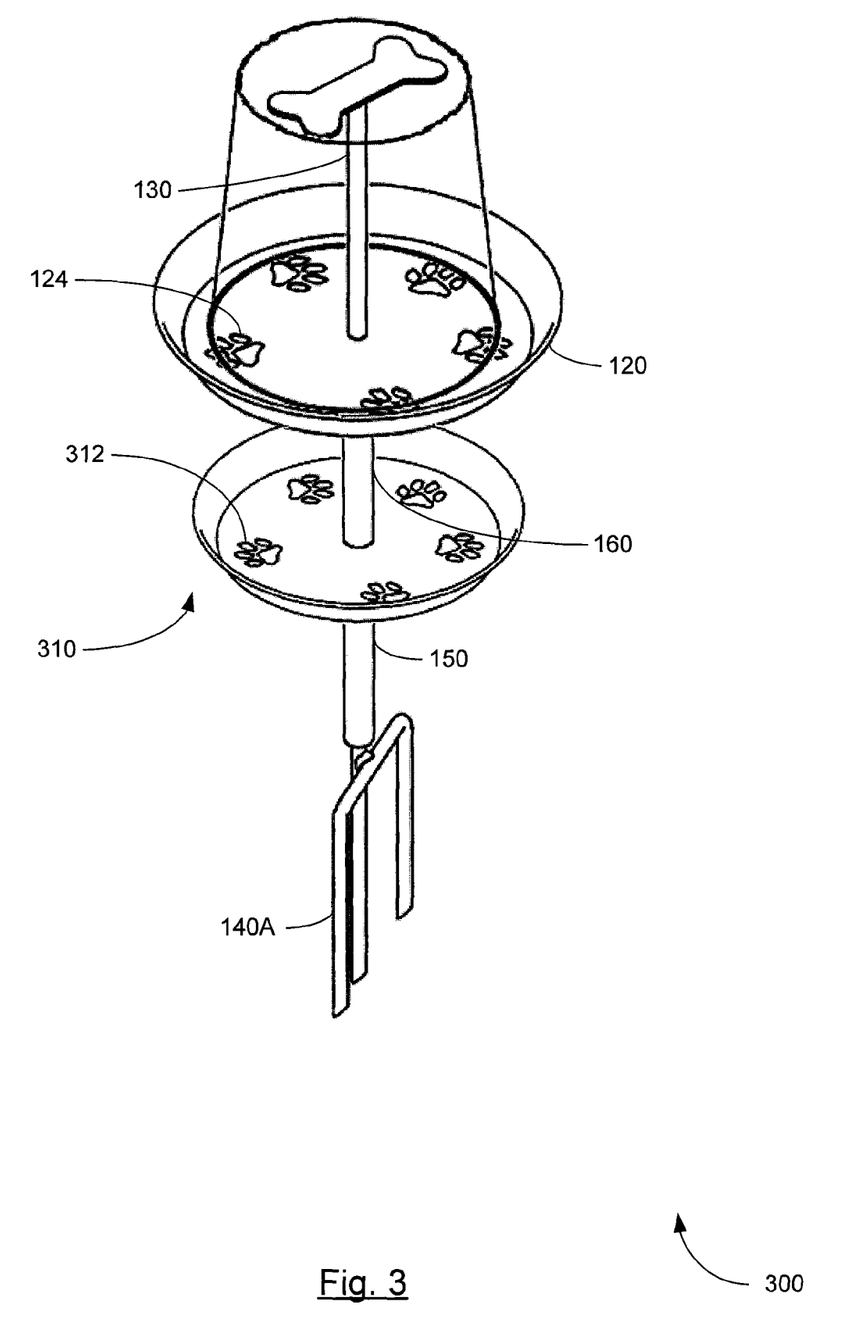
FIG. 3 is a drawing of another apparatus embodiment of the invention, similar to FIG. 2, except also having a collection element.

FIG. 2 is a drawing of the apparatus 100 from FIG. 1, fully assembled with a frozen edible substance supported by the apparatus. FIG. 3 is a drawing of another assembled apparatus 300 of the invention, similar to FIG. 2, except also having a collection element 310 to collect melting edible substance. In FIG. 3, inset markings 124 may be openings through support element 120. The openings may allow the edible substance, once melted to drain from support element 120, fall or run down extension element 160 and collect in collection element 310. Inset markings 312 may not be openings in embodiments that are configured to hold liquid edible substance in collection element. In some embodiments, collection element 310 may have no inset markings 312 at all. In various embodiments, collection element may also be larger or smaller, or a different shape. For instance in embodiments where support element 120 is flat rather than a pan-shaped member as shown in FIG. 3, collection element 310 may be larger than support element 120 and/or collect melting edible substance as it falls from the edges of support member 120. In other embodiments, collection element 310 may be located below extension element 150, providing a greater distance between support element 120 and collection element 310.

Figure 4:
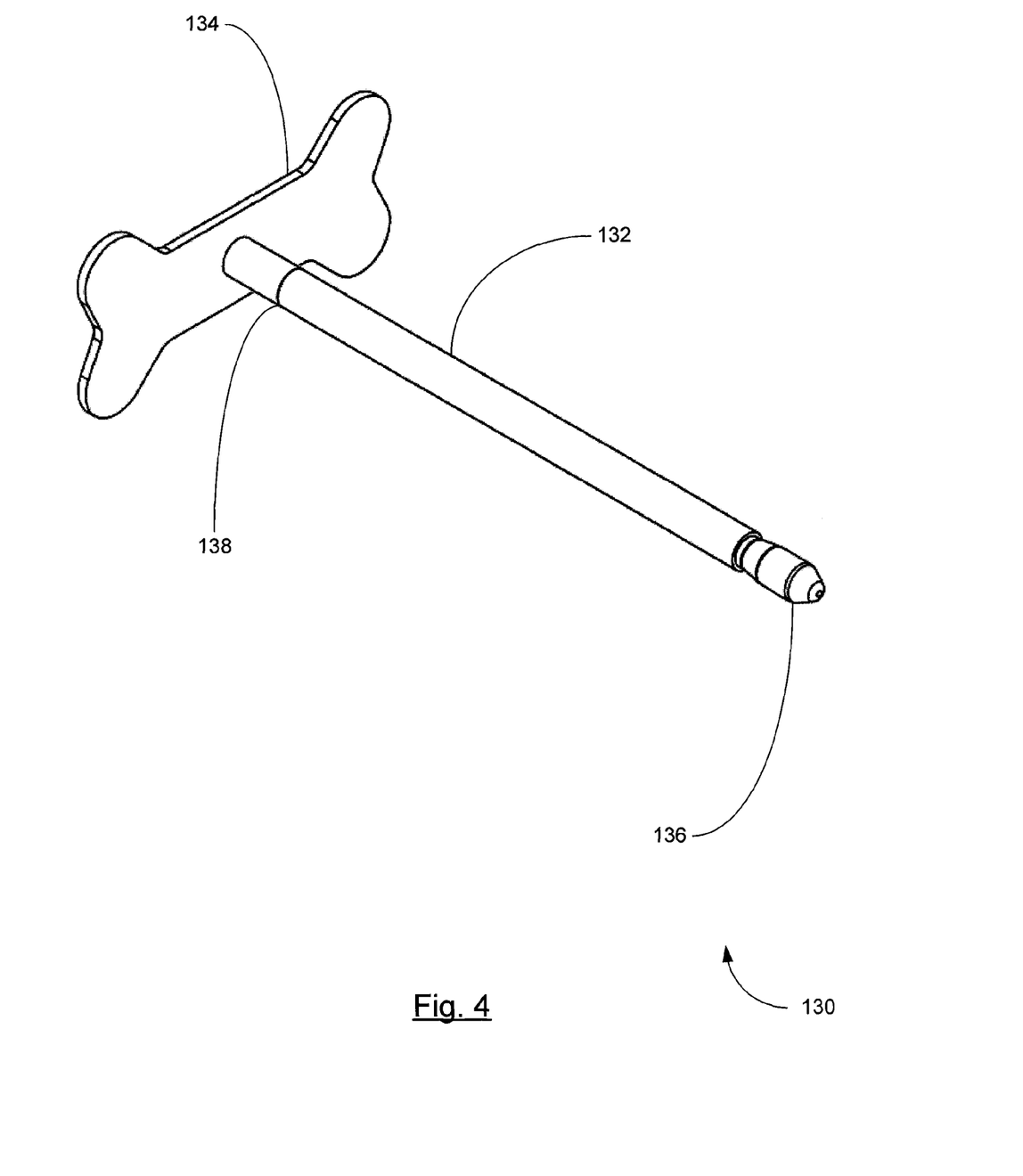
FIG. 4 is a drawing of one possible securing element used in some embodiments of the invention.

FIG. 4 is a drawing of one possible securing element 130 used in some embodiments of the invention. As shown in previous figures, securing element 130 includes a longitudinal member 132 and a lateral member 134. Coupling tip 136 is also shown. Additionally, in this embodiment, securing element 130 has a coupling point 138 for the longitudinal member 132 and the lateral member 134. Coupling point 138 may allow a user to uncouple lateral member 134 from longitudinal member 132, possibly to attach a different lateral member having a different shape, as discussed above, to the longitudinal member 132.

Figure 5:
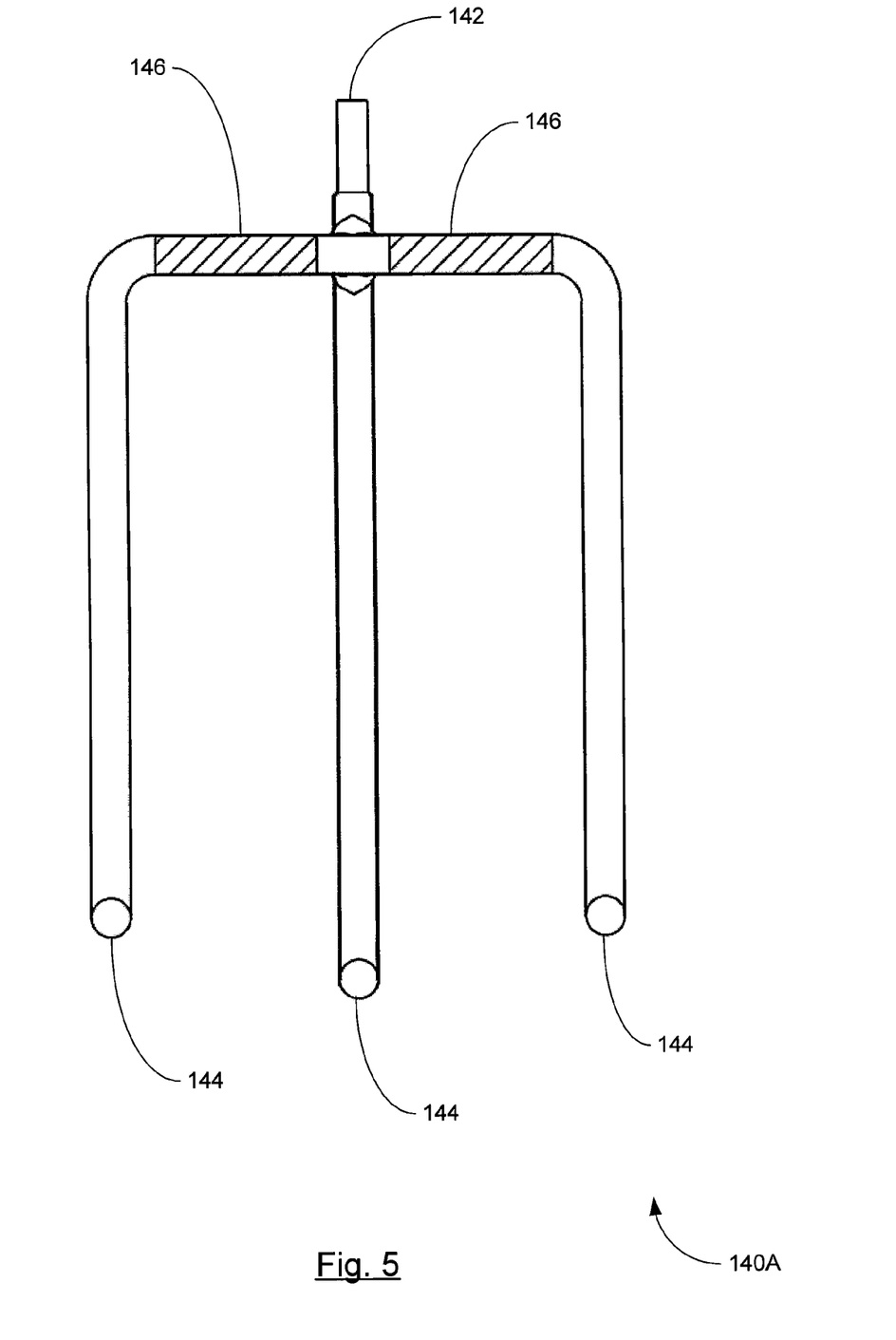
FIG. 5 is a drawing of one possible mounting element of the invention having a pitchfork member.
Figure 6:
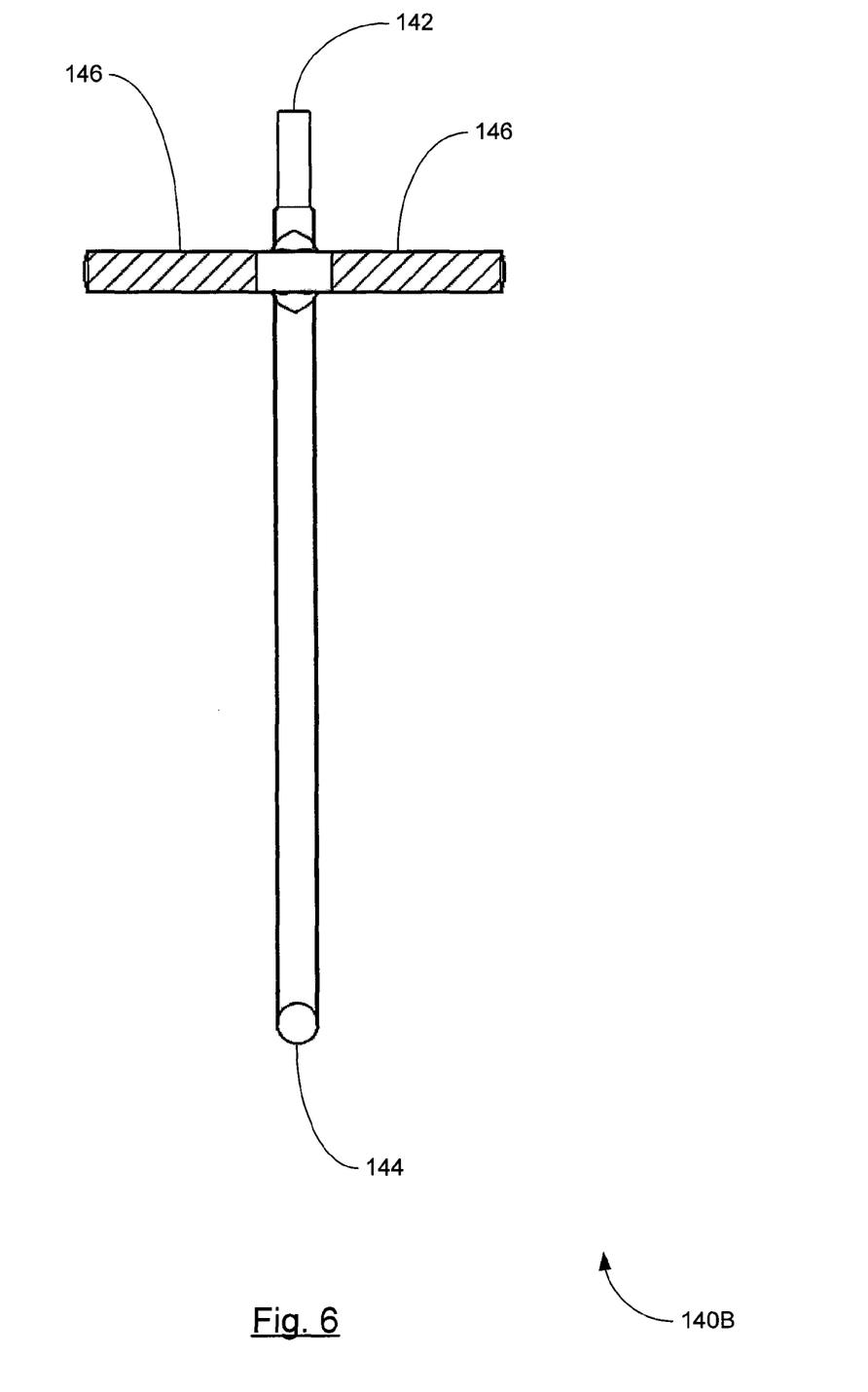
FIG. 6 is a drawing of one possible mounting element of the invention having a spiked member.

FIG. 5 is a drawing of one possible mounting element 140A of the invention having a pitchfork member. Coupling point 142 is shown, as well as penetration points 144. Note that in some embodiments, fewer or more penetration points 144 may be employed, and may or may not be coplanar. Grip areas 146 are also shown. Grip areas 146 may be areas of the mounting element 140A which are knurled or otherwise roughed to provide point to grip mounting element 140A. They may also provide friction for a foot of a user who drives mounting element 140A into a surface with their leg rather than by hand. In some embodiments the grip areas 146 may be covered with another substance such as a plastic or polymer sleeve to provide grip. FIG. 6 is a drawing of another possible mounting element 140B of the invention, similar to that in FIG. 5, except having a single spiked member. In this embodiment, the mounting element 140B has only one penetration point 144, instead of a plurality as in other possible embodiments.

Figure 7:
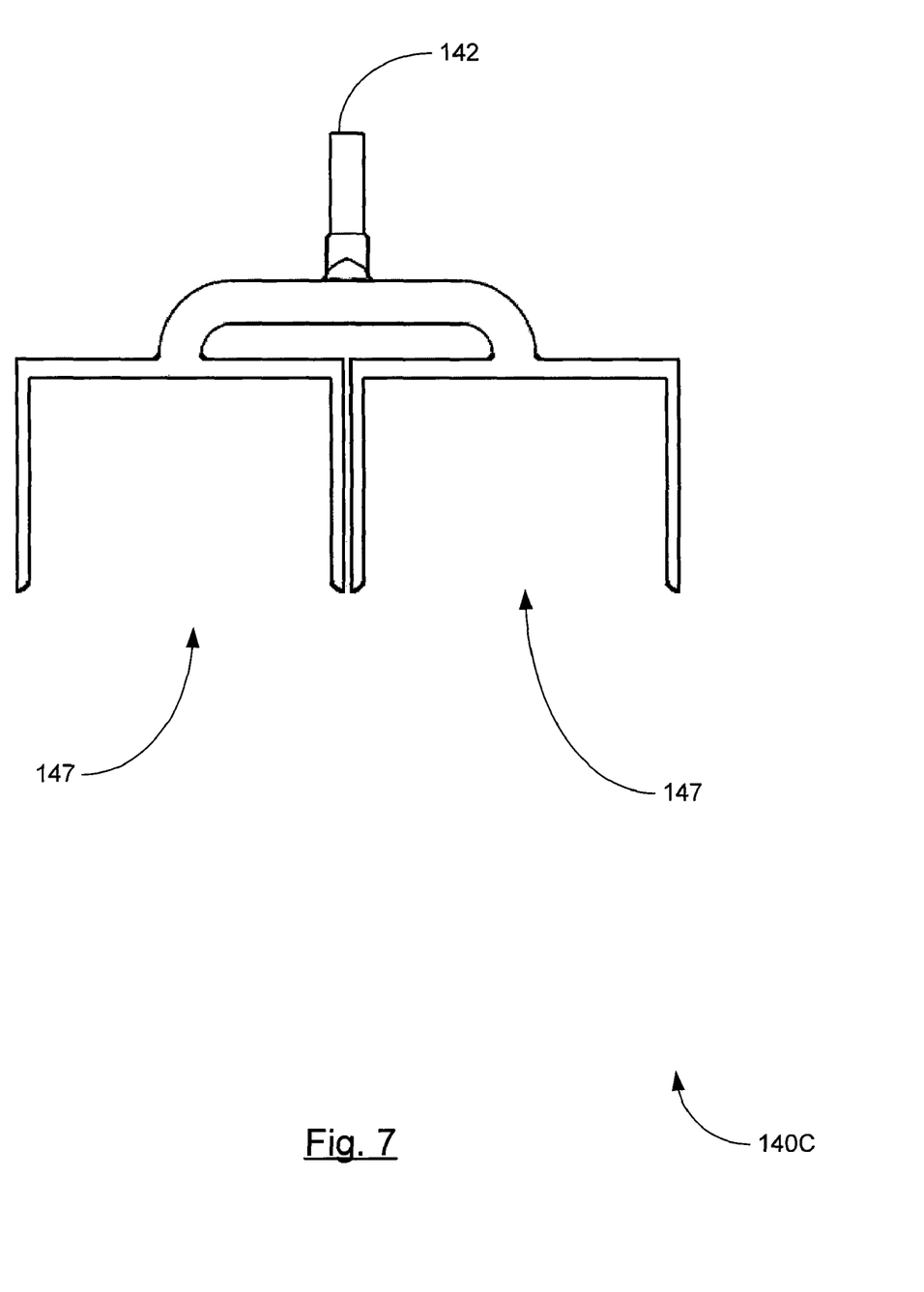
FIG. 7 is a drawing of one possible mounting element of the invention having a channel member.

FIG. 7 is a drawing of another possible mounting element 140C of the invention having a plurality of channel members 147. The channel members 147 may be configured in some embodiments to detachably couple with components of a deck or other surface. The vertical walls of the channels 147 may be inserted between components of a deck, such as wooden, plastic, polymer boards, and/or the like. The sides of the vertical walls may be knurled, roughed and/or otherwise shaped to provide some amount of friction with the deck so that mounting element 140C is secured more in place. Other portions of the channels 147 may also be knurled or roughed to provide additional friction, for example the bottom of the channels.

Figure 8:
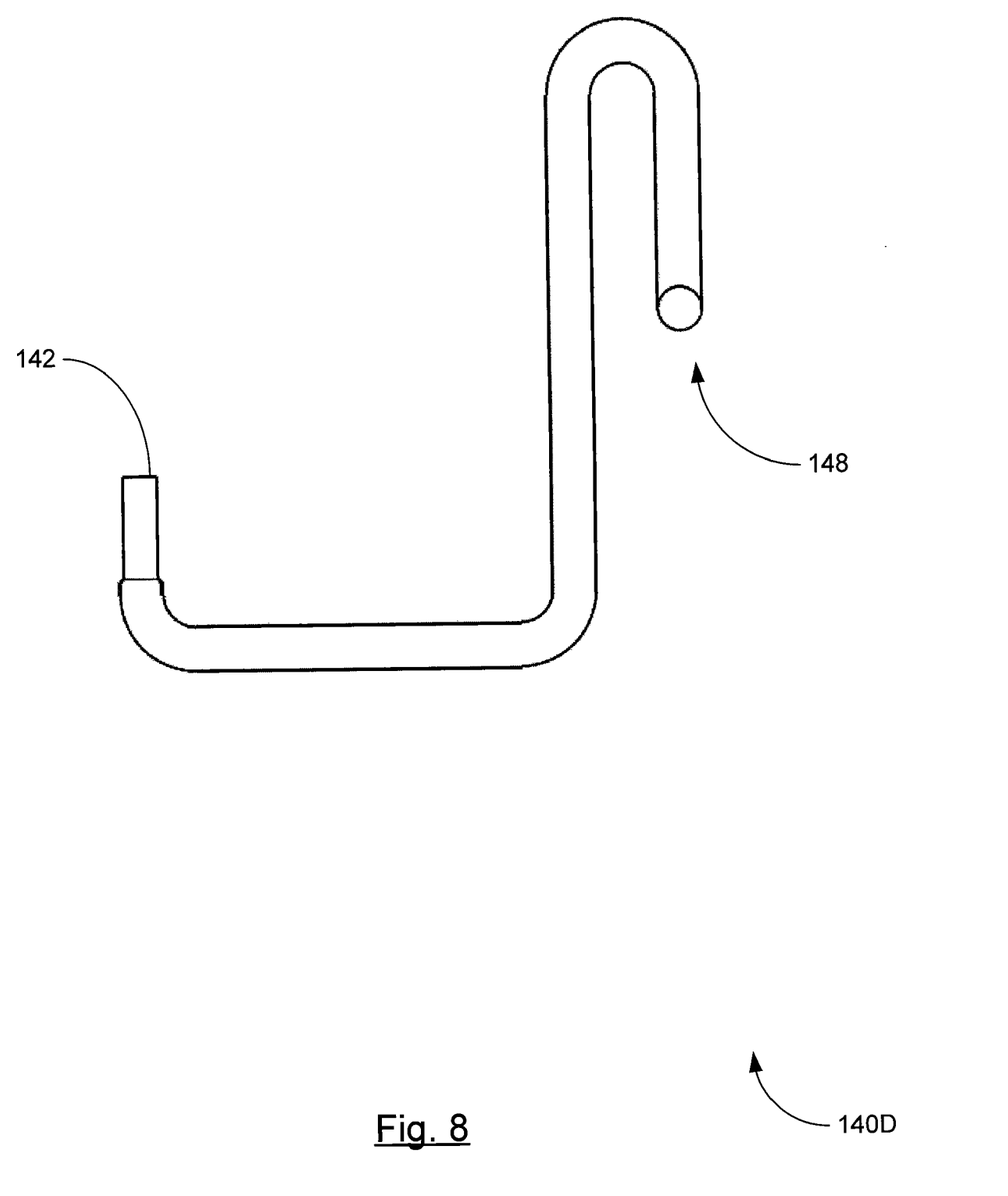
FIG. 8 is a drawing of one possible mounting element of the invention having a hooked member.

FIG. 8 is a drawing of another possible mounting element 140D of the invention having a hooked member 148. Hooked member 180 may be employed to hang mounting element 140D on a vertical surface, for example a chain link fence or plank-fence with openings to accept the hooked member 180. In some embodiments, multiple hooked members may be employed to make mounting element 140D more stable. The multiple hooked members may all couple to the same coupling point 142. The weight of the edible substance on the support element coupled with mounting element 140D may push mounting element 140D into the surface, thereby making it more stable.

Figure 9:
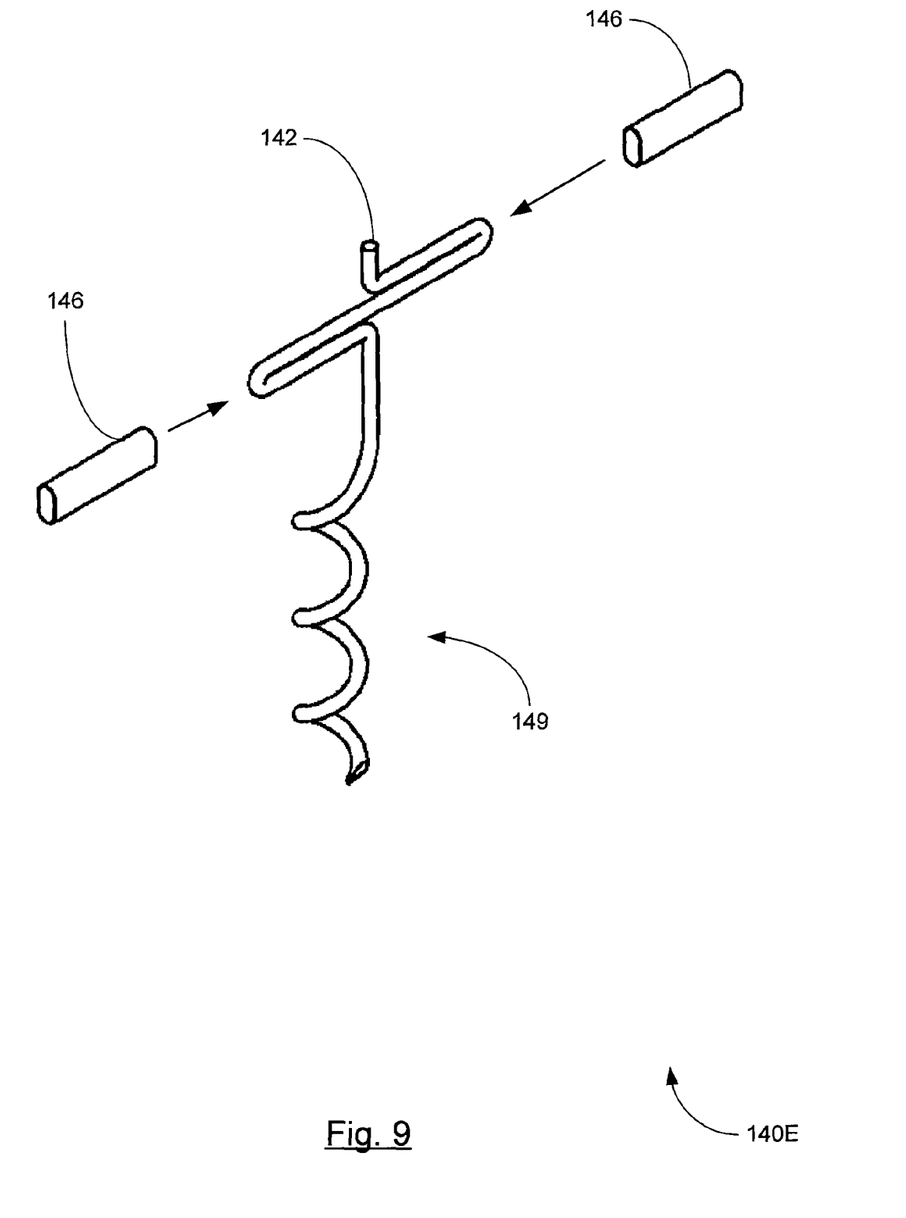
FIG. 9 is a drawing of one possible mounting element of the invention having a corkscrew member.

FIG. 9 is a drawing of another possible mounting element 140E of the invention having a corkscrew member 149. In this embodiment a user may push and rotate the corkscrew member 149 into a surface, possibly the ground. Grip areas 146 are shown in this embodiment as additional members which may be attached to mounting element 140E.

Figure 10:
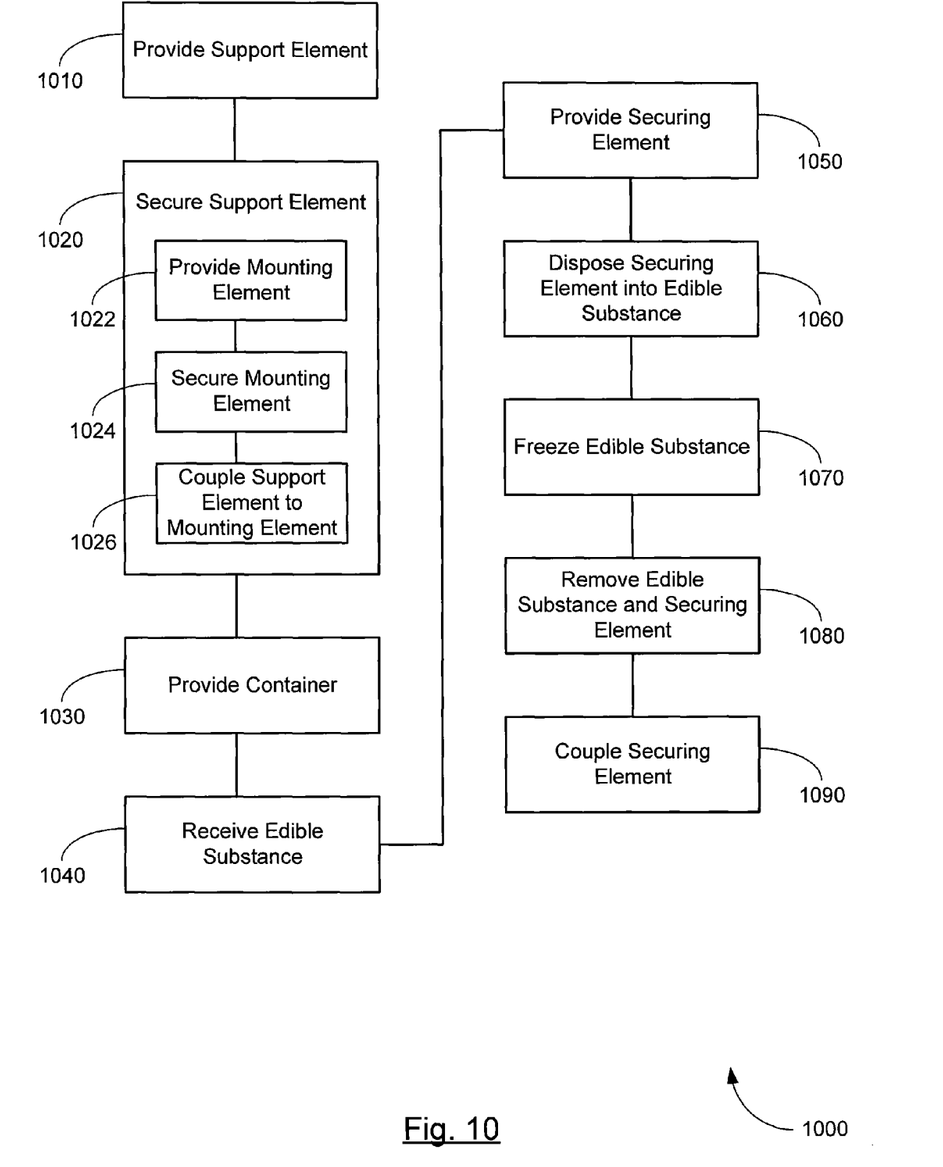
FIG. 10 is a block diagram of one method of the invention for providing a frozen edible substance to an animal.

FIG. 10 is a block diagram of a method 1000 of the invention for providing a frozen edible substance to an animal. At block 101 a support element 120 is provided. At block 1020 the support element is secured to a surface. In some embodiments, securing the support element may include steps of providing a mounting element 140 at block 1022, securing the mounting element 140 to a surface at block 1024, and coupling the support element 120 to the mounting element 140 at block 1026. At block 1030 a container 110 is provided. The edible substance is received into the container 110 at block 1040. At block 1050 a securing element 130 is provided. The securing element 130 is disposed in the edible substance at block 1060. At block 1070 the edible substance is frozen. The edible substance containing at least a portion of the securing element 130 is removed from the container 110 at block 1080. At block 1090 the securing element 1030 is coupled with the support element 120, thereby securing the frozen edible substance to the support element 120 for consumption by an animal.

A number of variations and modifications of the disclosed embodiments can also be used. For example, a spring loaded latch mechanism, as known in the art, could be used to couple the securing element 130 to another portion of the apparatuses of the invention in embodiments having a detachably coupleable securing element 130. In other embodiments the securing element 130 may be permanently coupled with the support element 120, and may be configured to accept "bundt" shaped frozen edible substances, or other shaped frozen edible substances with a hallow center. In these embodiments, the securing element 130 may prevent lateral movement, but the weight of the frozen edible substance may secure the edible substance vertically. In other embodiments, the frozen edible substance may be mounted horizontally. In some embodiments the frozen edible substance may be hung from a securing element 130 such as a rope, cord and/or the like, possibly from a tree or other object. In these embodiments, one end of the securing element 130 may be coupled with an object at an elevation above a surface, with the other end of securing element 130 may be coupled with support element 120, securing element 130, and/or some other portion of the apparatus. In some embodiments, the edible substance may be dried rather than frozen to achieve a solid shape that may be presented to an animal for consumption. Additionally, the support element 120 may merely be set on a surface in some embodiments. Furthermore, at least some portions of the apparatuses of the invention may merely be used as a serving apparatus to serve edible substances that are not frozen. Different elements of the invention may be used to create different serving heights of the edible substance. Various sizes of all of the different components may also be employed, possibly depending on the animal for which an edible substance is to be delivered.

The invention has now been described in detail for the purposes of clarity and understanding. However, it will be appreciated that certain changes and modifications may be practiced within the scope of the appended claims.

What is claimed is:

1. An apparatus that provides an edible substance to an animal, the apparatus comprising:
   a container configured to receive an edible substance, contain the edible substance during freezing of the edible substance, and be removable from the edible substance after freezing of the edible substance, the edible substance comprising a liquid;
   a support element configured to receive the edible substance after freezing of the edible substance and support the edible substance after freezing of the edible substance;
   a securing element, wherein:
      the securing element comprises a longitudinal member and a lateral member;
      the lateral member comprises a flat side;
      the flat side is configured to be supported by a bottom of the container across an entirety of the flat side during freezing of the edible substance;
      the lateral member is sized such that it is substantially the same length as the diameter of the bottom of the container;
      the securing element is configured to couple with the edible substance during freezing of the edible substance;
      the securing element is configured to secure the edible substance to the support element; and
      the support element is configured to allow the edible substance, during melting of the edible substance, to drain from the support element; and
   a mounting element configured to couple with the support element and secure the support element to a surface.

2. The apparatus for providing an edible substance to an animal of claim 1, wherein the container comprises a bucket.

3. The apparatus for providing an edible substance to an animal of claim 1, wherein the support element comprises a pan-shaped member.

4. The apparatus for providing an edible substance to an animal of claim 1, wherein the apparatus further comprises a collection element configured to collect at least a portion of the edible substance after melting of the edible substance.

5. The apparatus for providing an edible substance to an animal of claim 1, wherein the longitudinal member is detachably coupled with the lateral member.

6. The apparatus for providing an edible substance to an animal of claim 1, wherein the mounting element comprises a selection from a group consisting of:
   a pitchfork member;
   a spiked member;
   a channel member;
   a hooked member; and
   a corkscrew member.

7. The apparatus for providing an edible substance to an animal of claim 1, wherein the surface comprises a selection from a group consisting of:
   the ground;

a deck;
a floor;
a kennel;
a cage;
a tree;
an animal enclosure; and
a fence.

8. The apparatus for providing an edible substance to an animal of claim 1, wherein the apparatus further comprises an extension element configured to:
   couple with the mounting element;
   couple with the support element; and
   be disposed between the mounting element and the support element.

9. The apparatus for providing an edible substance to an animal of claim 1, wherein the apparatus further comprises the edible substance.

10. The apparatus for providing an edible substance to an animal of claim 1, wherein the support element and the mounting element are distinct pieces.

11. The apparatus for providing an edible substance to an animal of claim 1, wherein the apparatus further comprises a lid, wherein the lid comprises two sides, and wherein the lid defines an aperture configured to allow the securing element to pass through the aperture to each of the two sides of the lid.

12. The apparatus for providing an edible substance to an animal of claim 1, wherein the securing element is directly supported by the container during freezing of the edible substance.

13. The apparatus for providing an edible substance to an animal of claim 1, wherein the lateral member comprises a bone-shaped member.

14. An apparatus that provides an edible substance to an animal, the apparatus comprising:
   a container configured to receive an edible substance, contain the edible substance during freezing of the edible substance, and be removable from the edible substance after freezing of the edible substance;
   a support element configured to receive the edible substance after freezing of the edible substance and support the edible substance after freezing of the edible substance;
   a securing element, wherein:
      the securing element comprises a longitudinal member and a lateral member;
      the lateral member comprises a flat side;
      the flat side is configured to be supported by an inner bottom of the container across an entirety of the flat side during freezing of the edible substance;
      the securing element is configured to couple with the edible substance during freezing of the edible substance; and
      the securing element is configured to secure the edible substance to the support element; and
   a mounting element configured to couple with the support element and secure the support element to a surface.

15. The apparatus for providing an edible substance to an animal of claim 1, wherein the flat side of the lateral member is configured to be coplanar with an outer surface of the edible substance after freezing of the edible substance.

16. An apparatus that provides an edible substance to an animal, the apparatus comprising:
   a mounting element comprising at least one prong configured to be driven into a surface;
   an elongated element having a bottom end and a top end, wherein the bottom end is coupled to the top of the mounting element;
   a support member comprising a pan, wherein the top end of the elongated element is coupled orthogonally to the center of the pan;
   a securing element comprised of a longitudinal member and a lateral member, wherein:
      the longitudinal member has a bottom end and top end;
      the bottom end of the longitudinal member is coupled orthogonally to the center of the pan, collinear with the elongated element;
      the top end of the longitudinal element is coupled to the center of the lateral element; and
      the lateral member comprises a flat top side; and
   a container, having an open top, closed sides, and closed bottom, wherein:
      the closed bottom comprises an inner surface;
      a portion of the longitudinal member is disposed inside the container;
      the lateral member is completely disposed inside the container; and
      the inner surface of the closed bottom of the container contacts the entire flat side of the lateral member when the container is inverted.

17. The apparatus for providing an edible substance to an animal of claim 16, further comprising a frozen edible substance that conforms to the shape of the container, wherein a portion of the longitudinal member is disposed within the frozen edible substance.

18. The apparatus for providing an edible substance to an animal of claim 16, wherein the top end of the elongated element comprises a coupling tip, wherein the support member further defines a hole through the center of the pan, and wherein the diameter of the hole is greater than the diameter of the coupling tip but less than the diameter of the remainder of the elongated element.

19. The apparatus for providing an edible substance to an animal of claim 16, wherein the support element further a comprises a circumferential lip to contain a melted liquid.

20. The apparatus for providing an edible substance to an animal of claim 16, further comprising a second pan disposed below the support member, wherein the elongated element is disposed through the center of the second pan.

* * * * *